United States Patent [19]

Marhoefer

[11] Patent Number: 4,540,928
[45] Date of Patent: Sep. 10, 1985

[54] CLOSED LOOP RESONANCE COMPENSATION CIRCUIT FOR STEPPER MOTORS

[75] Inventor: Michael Marhoefer, Chicago, Ill.

[73] Assignee: Bodine Electric Company, Chicago, Ill.

[21] Appl. No.: 591,020

[22] Filed: Mar. 19, 1984

[51] Int. Cl.³ .............................................. H02K 29/04
[52] U.S. Cl. ...................................... 318/696; 318/685
[58] Field of Search ................................. 318/696, 685

[56] References Cited

PUBLICATIONS

Minor, "A Circuit for Controlling Mid-Frequency Resonance in Permanent Magnet Step Motors", Proceedings, Ninth Annual Symposium on Incremental Motion Control Systems and Devices, Kno, Editor, Incremental Motion Control Systems Society, Champaign Ill., 1980.

Primary Examiner—William M. Shoop, Jr.
Assistant Examiner—Saul M. Bergmann
Attorney, Agent, or Firm—Allegretti, Newitt, Witcoff & McAndrews, Ltd.

[57] ABSTRACT

A closed loop resonance compensation method and circuit for a stepper motor stabilizes the stepper motor control system while operating in the mid-frequency range. The stepper motor stabilization method and means corrects for mid-frequency resonance errors by deriving a velocity error signal from the total current in the motor windings and uses this signal, through feedback to the source of clock pulses, to correct the short term rotor velocity with respect to the stator field.

12 Claims, 3 Drawing Figures

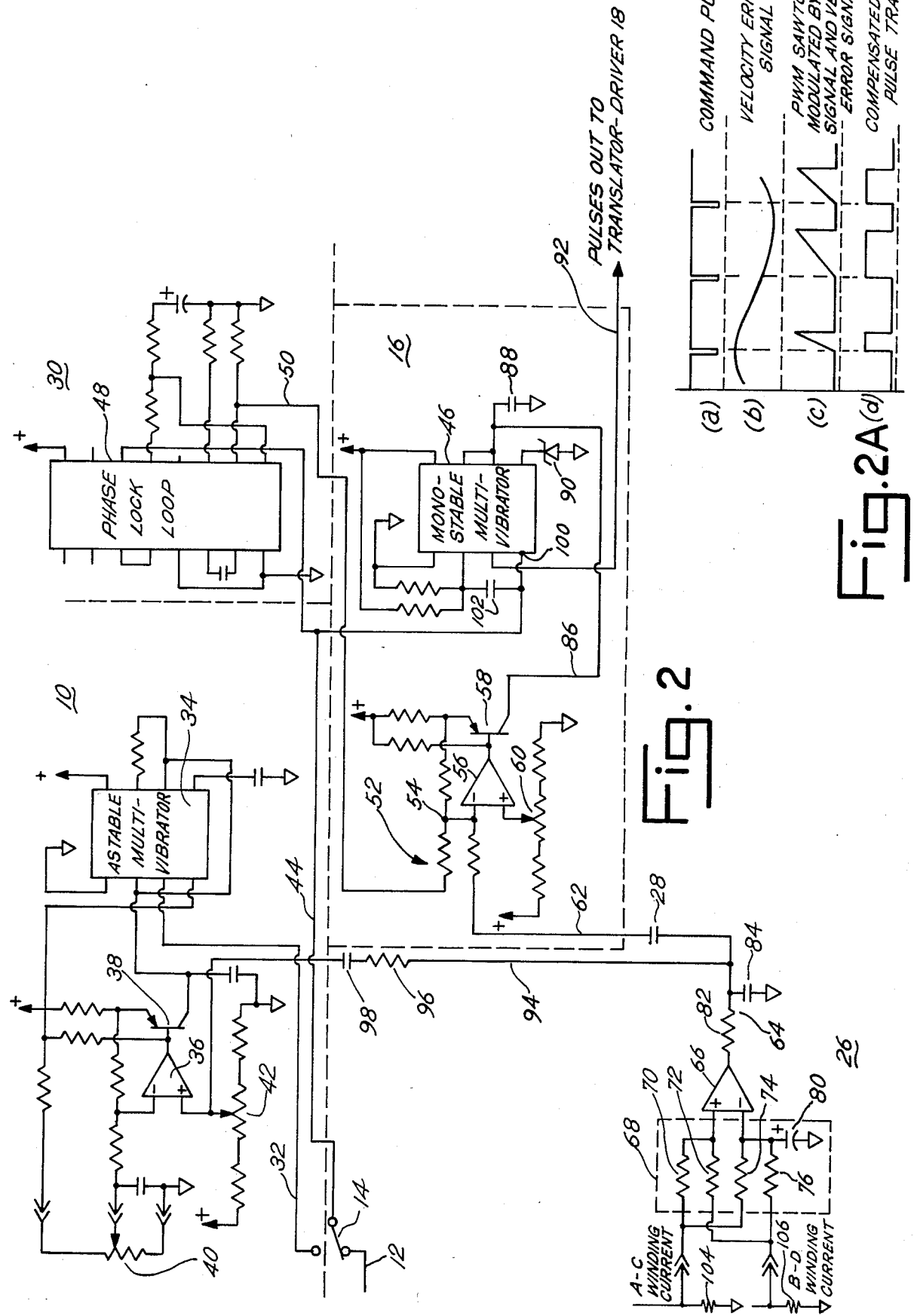

CLOSED LOOP RESONANCE COMPENSATION CIRCUIT FOR STEPPER MOTORS

BACKGROUND OF THE INVENTION

The present invention relates generally to stepper motors, and more particularly to a closed loop resonance compensation circuit for stabilizing the stepper motor control system while operating in the mid-frequency resonance region.

As is generally known, a stepper motor provides controllable speed or position in response to input control pulses commonly applied from an appropriate control circuit Since the stepper motor increments in a precise amount with each control pulse it converts digital information, as represented by the input control pulses, to corresponding incremental rotation.

Conventionally there are three regions of operation in a stepper motor in terms of speed. In the low frequency region, the stepper motor develops full value or maximum torque. This region normally is in the range of about 70 to 200 pulses per second, dependent upon motor size.

The error free start-stop (EFSS) region normally falls within the range of about 120–1200 pulses per second, dependent upon motor size. In this EFSS region, the stepper motor can be started or stopped at any point without error.

The slew region is a relatively high speed region which generally is associated with acceleration and deceleration controls. Typically, the stepper motor is accelerated or ramped up to the slew rate and later is decelerated or ramped down from the slew rate to stop at the desired end position for the motor. In order to maintain synchronism between the input control pulses and the motor speed or position, it is common to accelerate the motor slowly from the error free start stop rate to the slew rate, in a manner provided by the motor control circuit.

The slew curves for a stepper motor show the maximum speeds and torques at which the motor may be operated without losing steps, provided that acceleration and deceleration control is employed. In many cases these slew curves display torque "dips" which illustrate mid-frequency resonance regions in which the motor cannot be operated for any length of time, unless suitable provision is made to stabilize the stepper motor control system while operating in the mid-frequency resonance region.

Mid-frequency resonance is a phenomena characterized by the premature loss of torque exhibited by a step motor when operated at a step rate higher than its maximum error free start-stop rate. This phenomena is analogous to the "hunting" of an unloaded synchronous motor rotor as it seeks a stable equilibrium with the rotating stator field. In an uncompensated step motor system this velocity oscillation about the velocity of the stator field is induced by a perturbation in the system, which may be caused by load changes, power supply variations, or abrupt stator velocity changes (acceleration). Once the disturbance has been introduced to the system, the rotor velocity will begin to oscillate at a low frequency (as compared to the step rate). The velocity fluctuations will increase in amplitude slowly until the rotor position leads or lags the stator field by 2 or more steps, at which time the rotor will be equally attracted to two stator poles, lose synchronism and stall.

From the description of the mechanics of mid-frequency resonance above, it may be understood that the feedback of velocity information into the step motor control system, in such a manner as to reduce the amplitude of the rotor velocity fluctuations with respect to the stator field, may greatly reduce, if not entirely eliminate, the premature loss of torque exhibited by a step motor when operated in the midfrequency resonance region.

It is therefore one object of the present invention to provide an improved method and means for stabilizing a stepper motor/control system while operating in the midfrequency resonance region. It is another object of the present invention to provide an improved stepper motor stabilization method and means which corrects for mid-frequency resonance errors by deriving a velocity error signal from the total current in the motor windings and using this signal, through feedback to the source of clock pulses, to correct the short term rotor velocity with respect to the stator field, without affecting the average velocity, and the distance traveled as determined by the command pulse train.

SUMMARY OF THE INVENTION

These and other objects of the invention are achieved, in accordance with the invention, by a resonance compensation circuit which uses a continuous signal representing the error in velocity between the rotor and the stator field as feedback to the source of the clock pulses which control the stator field velocity, thus attempting to reduce the velocity differences between the rotor and stator field through a closed loop feedback system.

In a preferred embodiment of the invention, the command pulse source, which may be internal or external, provides command pulses to a pulse width modulator and a pulse width modulator optimization circuit. The output of the pulse width modulator is applied to a translator and power drive for the stepper motor windings. A comparator circuit compares the averaged sum of the motor winding currents with the sum of the instantaneous currents in the motor windings to generate a square wave having a pulse width corresponding to the difference between the compared currents. This square wave pulse, whose width varies proportionally to the deviation of the rotor velocity about a nominal rotor speed, is applied to an integrator, the output of which is an analog signal representing rotor velocity variations about a nominal rotor speed.

The integrated pulses are differentiated to remove D.C. components and the result is a derived A.C. velocity error signal which is fed back to the pulse width modulator. The pulse width modulator bias optimization circuit includes a phase lock loop circuit and the phase lock loop signal from the latter is summed with the derived A.C. velocity error signal to correct the short term rotor velocity with respect to the stator field. This correction results in the active edge of the output clock pulse being shifted in or out by a time delay proportional to the velocity error signal. This shift in time causes the rotor velocity to increase or decrease towards the nominal command rate in a manner which brings the instantaneous rotor velocity closer to the desired average velocity.

BRIEF DESCRIPTION OF THE DRAWINGS

The present invention is described in greater detail with respect to the attached drawings in which:

FIG. 2 is a part block and part schematic circuit diagram illustrating one preferred embodiment of the present invention; and FIG. 2A illustrates the signal wave forms appearing at selected portions of the circuit diagram of FIG. 2.

DETAILED DESCRIPTION OF THE PREFERRED EMBODIMENT

Figure 1:
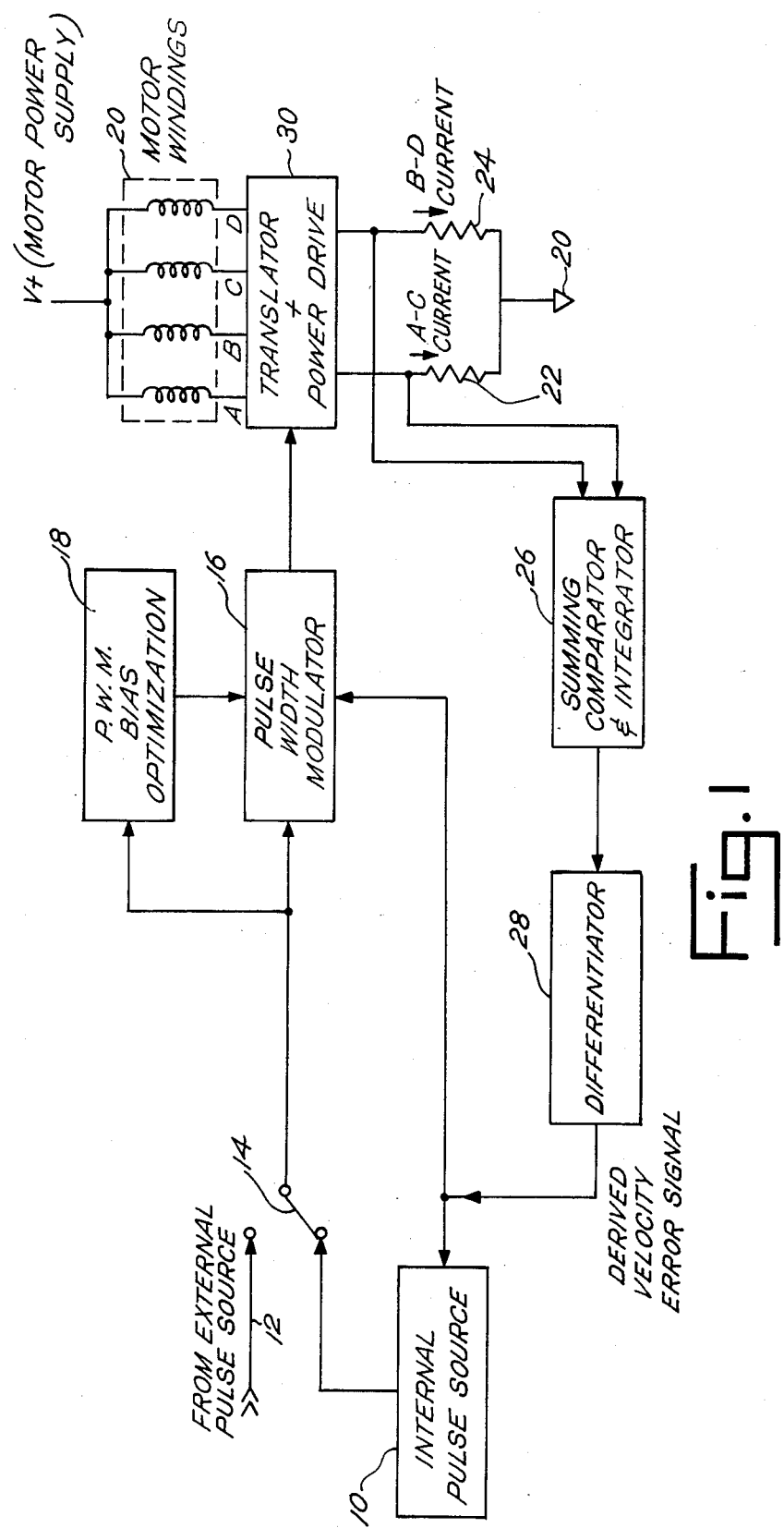
FIG. 1 is a block diagram of an illustrative closed loop resonance compensation circuit for stepper motors in accordance with the invention.

As illustrated in the block diagram of FIG. 1, the resonance compensation circuit comprises a command pulse source which can take the form of an internal pulse source 10 or an external pulse source connected to the lead 12. Either of these pulse sources may be selected by means of the switch 14 for applying pulses to the pulse width modulator 16. In one form of the invention, the command pulses applied to the pulse width modulator 16 are square wave pulses in the frequency range of up to 15,000 pulses per second, although it is understood that this invention can be adapted for use with other pulse shapes and frequencies.

The pulses from the pulse source 10 or 12 also are applied to the pulse width modulation bias optimization circuit 18 which, in turn, has a bias voltage output to the pulse width modulator 16. The output of the pulse width modulator 16 is applied to the translator and power drive circuit 30, shown connected to one end of each of the motor windings 20, as represented by windings A, B, C and D. The other end of each of the motor windings 20 is connected to the motor power supply V+. The translator and power drive 30 also is connected to the ground 20 through the resistance 22 and the resistance 24. The resistance 22 provides a voltage proportional to the current in the A-C motor windings and the resistance 24 provides a voltage proportional to the current in B-D motor windings. The voltages developed across resistance 22 and resistance 24 are applied to a summing comparator and integrator 26 which, as explained below, compares the sum of the instantaneous motor winding currents with the averaged sum of the instantaneous motor winding currents to provide to the differentiator 28 an A.C signal representing the rotor velocity variations about nominal rotor speed.

This signal is differentiated and the D.C. components thereof are removed by the differentiator 28 to provide a derived velocity error signal that is fed back to the internal pulse source 10 and the pulse width modulator 16. Inasmuch as the resonance compensation circuit illustrated in FIG. 1 uses a continuous signal, representing the error in velocity between the rotor and the stator field, as feedback to the source of the clock pulses which control the stator field velocity to reduce the difference in velocity between the rotor and stator field, the circuit is a closed loop resonance compensation system.

In the operation of the illustrative closed loop resonance compensation control circuit shown in FIG. 1, the pulse width modulator 16 uses the derived velocity error signal to correct the short term rotor velocity with respect to the stator field. The summing comparator and integrator 26 scales the motor winding current signals from the power drive 30 to a value that is within the input range of the pulse width modulator 16. The derived velocity error signal at the output of the differentiator 28 represents the velocity error signal over the motor speed range where mid-frequency resonance occurs.

The circuit of the present invention effects its correction of rotor velocity by sensing the difference between the average motor current, and the instantaneous motor current, converting this difference into a correction voltage and feeding the A.C. portion of this correction voltage, denominated the derived velocity error signal, into the pulse width modulator current source. This, is effect, either adds or subtracts a portion of the total current being used to charge a capacitor which generates the width of the pulse width modulator pulse, and thus corrects the instantaneous rate at which the motor is stepping, without affecting the average step rate. In one particular embodiment of the invention, this correction was as much as + or −45% of the command pulse period.

As described in greater detail below with respect to the schematic diagram of FIG. 2, the pulse width modulation bias optimization circuit 18 uses a phase lock loop circuit, locked to the command pulse rate to generate a bias voltage which, when applied to the pulse width modulator 16, causes the pulse width modulator output (with no velocity error signal applied) to assume a 50% duty cycle at the command pulse rate. This allows the velocity error signal to modulate the pulse width, and thus the actual stepper motor command, in such a manner that the rotor velocity can be increased or decreased from the command rate without changing the average velocity.

A schematic circuit of one preferred embodiment of the closed loop resonance compensation circuit shown in the FIG. 1 block diagram is depicted in FIG. 2 of the drawing.

The command pulses are provided at the switch contact 14 by the lead 12 connected to a suitable external pulse source or by the lead 32 connected to the internal pulse source 10. In the illustrative embodiment of FIG. 2, the internal pulse source 10 comprises an astable multivibrator 34, which advantageously may be an ICM 7555 chip currently being marketed by Intersil, or any other equivalent commercially available chip. The astable multivibrator 34 is connected through a circuit including the op amp 36 and transistor 38 to internal frequency adjust means 40 and offset null means 42. The internal frequency adjust means 40 advantageously is located on the front panel of the stepper motor control circuit for convenient access to and adjustment by the operator. The offset null means 42 normally is a factory adjustable potentiometer located within the resonance compensation control circuit.

The comand pulses from the external pulse source 12 or the internal pulse source 10 in one particular embodiment of the invention advantageously are in the form of square waves at a frequency in the range of 0 to 15,000 pulses per second. These command pulses are provided from the switch contact 14 and the command pulse lead 44 to a terminal of the monostable multivibrator chip 46 in the pulse width modulator 16. The command pulses also are provided to a terminal of the phase lock loop chip 48 in the pulse width modulator bias optimization circuit 48.

In one preferred embodiment of the invention, the monostable multivibrator chip 46 comprises a NE555 chip of the type marketed by Signetics, and the phase lock loop chip 48 comprises an MC 14046 chip of the type marketed by Motorola. It will be understood that such chips are merely representative and that equivalent commercially available chips also may be used as components of the present invention.

The output from the phase lock loop circuit is a bias voltage on the lead 50, connected to the voltage-to-current converter 52 comprising the summing network 54, the op amp 56 and the transistor 58. One input terminal of op amp 56 is connected to the adjustable offset null means 60 and the other input terminal of op amp 56 is connected to the lead 62 which provides the pulse width modulator 16 with the velocity error signal from the differentiator 28, the integrator 64, the comparator 66, and the summing circuit 68. As described heretofore, the integrator 64, comparator 66 and summing circuit 68 are part of the summing comparator and integrator means 26 shown in FIG. 1.

In the operation of the resonance compensation control circuit of FIG. 2, the voltage developed by the A-C winding current across resistance 104 is applied to resistances 70 and 74 of the summing circuit 68 and the voltage developed across resistance 106 is applied to resistances 72 and 76 of summing circuit 68. The transient input or D.C. signal corresponding to the sum of the instantaneous winding currents is present at the positive terminal of the comparator 66, while the reference input or long term D.C. signal corresponding to the averaged sum of the instantaneous winding currents is present at the negative terminal of the comparator 66. This latter signal is provided by the resistances 74 and 76 connected with the capacitor 80 as an integrating circuit.

The comparator 66, which may be in the form of a known open loop gain stage, provides an output square wave signal having a pulse width corresponding to the difference between the compared currents. These square wave pulses are applied to an integrator circuit comprised of the resistance 82 and the capacitor 84 to provide, at the output of the integrator, an analog signal which represents rotor velocity variations about a nominal rotor speed. This analog signal is differentiated by the capacitor 28, which also removes the D.C. voltage component, to result in a velocity error signal on the lead 62 to the voltage-to-current converter 52. The velocity error signal also is fed back by the lead 94, through the resistance 96 and capacitor 98 to the op amp 36 of the internal pulse source 10. The velocity error signal modulates the frequency of the internal pulse source 10 so as to change the frequency in a manner that reduces the difference between the composed currents at the integrator.

The velocity error signal provided to the voltage-to-current converter 52 of the pulse width modulator 16 is summed in the summing network 54 with the bias voltage output on the lead 50 from the phase lock loop 48 of the pulse width modulation optimization circuit 30.

The phase lock loop 48 is locked to the command pulse rate to generate a D.C. bias voltage output corresponding to the input frequency. When this D.C. bias voltage on the lead 50 is applied to the voltage-to-current converter, it forces the pulse width modulator output (if no velocity error signal is present) to assume a 50% duty cycle at the command pulse rate. This allows the velocity error signal to modulate the pulse width, and thus the step command on the lead 92 to the translator-driver 18, in such a manner that the rotor velocity can be increased or decreased from the command rate without changing the average velocity. Applying the command pulses to the "reset" pin 100 of the monostable multivibrator chip 46 and triggering through the capacitor 102 insures that the timing sequence is terminated upon receipt of the next clock pulse. This forces the circuit to send one pulse to the translator/driver 18 for each pulse received, which in effect maintains the average motor velocity at the command pulse rate.

The output of the voltage-to-current converter at the lead 86 is a current proportional to the bias voltage and the velocity error signal voltage. The voltage rate of change at the capacitor 88 is proportional to the current input. The zener diode 90 connected to a terminal of the monostable multivibrator 46 determines the voltage level at which the multivibrator will return to its normal state.

Thus, it is understood that the pulse width modulator 16 of the inventive resonance compensation control circuit uses the velocity error signal on the lead 62 to correct the average rotor velocity with respect to the stator field. This correction is accomplished by the voltage-to-current converter 52 charging the capacitor 88 at a rate proportional to the command pulse rate, plus or minus the amount of velocity correction required. This results in the active edge of the output clock being shifted in or out by a time delay proportional to the velocity error signal, which shift in time causes the rotor velocity to increase or decrease toward the nominal command rate.

The advantages and operation of the inventive circuit described above are further illustrated by the wave form curves of FIG. 2A. Waveform (a) illustrates the command pulses present at the switch contact 14, which pulses are obtained from either the internal or external pulse sources.

Waveform (b) of FIG. 2A illustrates the velocity error signal derived by the summing comparator and integrator 26, and the differentiator 28, and applied by the lead 62 to the voltage-to-current converter 52 of pulse width modulator 16.

Waveform (c) of FIG. 2A illustrates the voltage at the capacitor 88 of the pulse width modulator, which voltage is the pulse width modulator saw tooth modulated by the bias voltage signal and the velocity error signal.

Waveform (d) of FIG. 2A illustrates the compensated motor pulse train as it exists on lead 92, connected to the translator and power drive circuit 18. The timing starts at the positive going edge of each pulse and the motor steps at the negative going edge of each pulse, so that the width of each pulse represents a time delay proportional to the velocity error signal.

It is apparent that modifications and changes may be made in the operation and structure of the invention as described above without departing from the scope of the invention. The description has been made only by way of example, and is not to be taken as limiting the invention.

What is claimed is:

1. A closed loop resonance compensation circuit for a stepper motor comprising
    (a) a source of command pulses,
    (b) a pulse width modulator and pulse width bias optimization means connected to said source for receiving command pulses therefrom,
    (c) driving means for the stepper motor windings connected to the output of said pulse width modulator,
    (d) comparator means connected to said stepper motor windings for comparing the averaged sum of the winding currents with the sum of the instantaneous winding currents and for generating a signal having a pulse width corresponding to the difference between the compared currents, (e) integrating and differentiating means connected to said comparator means for providing a velocity error signal representing rotor velocity variations about a nominal rotor speed, (f) feedback means between the integrating and differentiating means, and the pulse width modulator for applying the velocity error signal to the pulse width modulator to modulate the width of the pulse width modulator output pulse to the motor driving means to correct the average rotor velocity with respect to the stator field.

2. A closed loop resonance compensation circuit for a stepper motor in accordance with claim 1 wherein said pulse width bias optimization means includes a phase locked loop circuit for generating a bias voltage output to the pulse width modulator.

3. A closed loop resonance compensation circuit for a stepper motor in accordance with claim 1 wherein said pulse width modulator includes a voltage-to-current converter connected to receive the velocity error signal and the bias voltage output from the pulse width modulator bias optimization means and to provide an output current proportional to the velocity error and the bias.

4. A closed loop resonance compensation circuit for a stepper motor in accordance with claim 1 wherein said source of command pulses comprises an internal pulse source having the velocity error signal fed back thereto.

5. A closed loop resonance compensation circuit for a stepper motor comprising
(a) a source of command pulses,
(b) pulse width modulator means connected to said source for receiving command pulses therefrom,
(c) driving means for the stepper motor windings connected to the output of said pulse width modulator means,
(d) comparator means connected to said stepper motor windings for comparing the averaged sum of the winding currents with the sum of the instantaneous winding currents and for generating a velocity error signal having a pulse width corresponding to the difference between the compared currents,
(e) feedback means between the comparator means and the pulse width modulator means for applying the velocity error signal to the pulse width modulator to modulate the width of the pulse width modulator output pulse.

6. A closed loop resonance compensation circuit for a stepper motor in accordance with claim 5 wherein said pulse width modulator means includes a voltage to current converter connected to the comparator means for receiving the velocity error signal.

7. A closed loop resonance compensation circuit for a stepper motor in accordance with claim 5 wherein said pulse width modulator means includes pulse width bias optimization means connected to said source for receiving command pulses therefrom, and for providing a bias voltage output corresponding to the input frequency of said command pulses.

8. An improved method of stabilizing a stepper motor control system while operating in the mid-frequency resonance region comprising the steps of
(a) applying command pulses to a pulse width modulator means,
(b) applying the output of the pulse width modulator means to driving means for the stepper motor windings,
(c) comparing the averaged sum of the winding currents with the sum of the instantaneous winding currents and generating a velocity error signal having a pulse width corresponding to the difference between the compared currents,
(d) feeding back the velocity error signal to the pulse width modulator means to modulate the width of the pulse width modulator output pulse to the motor driving means to correct the average rotor velocity with respect to the stator field.

9. An improved method of stabilizing a stepper motor control system while operating in the mid-frequency resonance region comprising the steps of
(a) comparing the averaged sum of the motor winding currents with the sum of the instantaneous winding currents,
(b) generating a velocity error signal representative of rotor velocity variations about a nominal rotor speed, and
(c) feeding back the velocity error signal to modulate the width of the motor step command pulse to correct the average rotor velocity with respect to the stator field.

10. An improved method of stabilizing a stepper motor control system while operating in the mid-frequency resonance region comprising the steps of
(a) comparing the averaged sum of the motor winding currents with the sum of the instantaneous winding currents,
(b) generating a velocity error signal representative of rotor velocity variations about a nominal rotor speed, and
(c) feeding back the velocity error signal to cause the active edge of the step command pulse to be shifted in or out by a time delay proportional to the velocity error signal.

11. A closed loop resonance compensation circuit for a stepper motor comprising
(a) a source of command pulses,
(b) pulse width modulator means connected to said source for receiving command pulses therefrom,
(c) driving means for the stepper motor windings connected to the output of said pulse width modulator,
(d) current sensing means connected to stepper motor windings for deriving a velocity error signal from the total current in the motor windings, and
(e) feedback means between the current sensing means and the pulse width modulator means for applying the velocity error signal to the pulse width modulator means to correct the average rotor velocity with respect to the stator field.

12. A closed loop resonance compensation circuit for a stepper motor in accordance with claim 11 wherein the velocity error signal is representative of rotor velocity variations about a nominal rotor speed.

* * * * *